Jan. 19, 1926.　　　　　　　　　　　　　1,570,394
F. R. PETERS
CONTROLLING MECHANISM FOR LOCOMOTIVE BOOSTER MOTORS
Filed Nov. 20, 1922
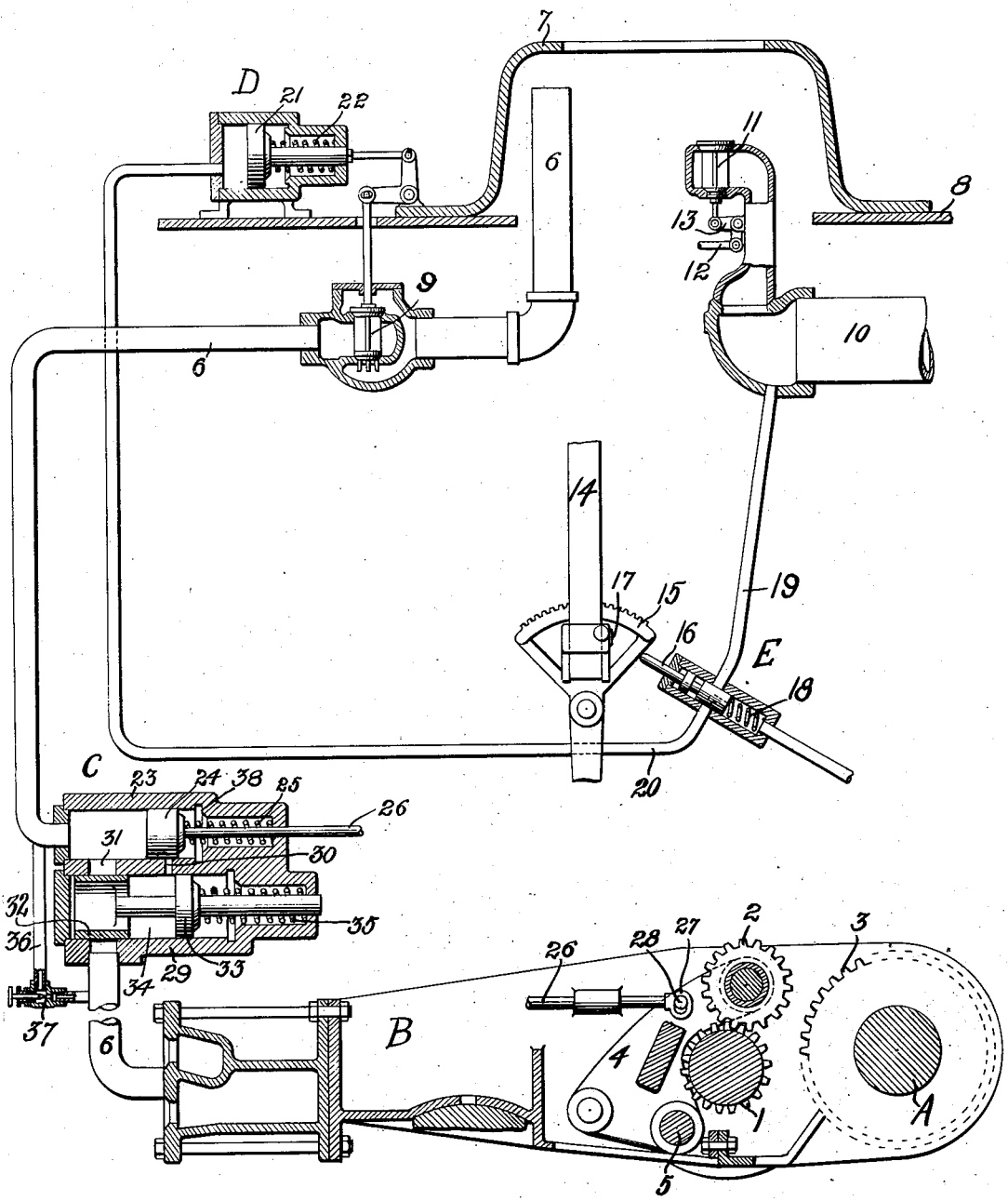
INVENTOR.
Frank R. Peters
BY
Synnestvedt & Lechner
ATTORNEYS.

Patented Jan. 19, 1926.

1,570,394

UNITED STATES PATENT OFFICE.

FRANK RICHARD PETERS, OF NEW YORK, N. Y., ASSIGNOR TO FRANKLIN RAILWAY SUPPLY COMPANY, A CORPORATION OF DELAWARE.

CONTROLLING MECHANISM FOR LOCOMOTIVE BOOSTER MOTORS.

Application filed November 20, 1922. Serial No. 602,254.

*To all whom it may concern:*

Be it known that I, FRANK RICHARD PETERS, a subject of the King of Great Britain, residing in the city of New York, county of New York, and State of New York, United States of America, have invented certain new and useful Improvements in Controlling Mechanism for Locomotive Booster Motors, of which the following is a specification.

My invention relates to auxiliary or booster motors for locomotives of the general character illustrated, for instance, in Mr. Howard L. Ingersoll's Patent No. 1,339,395, dated May 11th, 1920, and in his Patent No. 1,375,293, issued April 19th, 1921 and the particular object of the invention is the provision of a greatly improved and simplified controlling mechanism for such booster motors.

Briefly stated the function of a booster motor of the character above specified is to aid the main driving means of a locomotive in starting and in driving it at relatively low speeds. It is particularly useful during a slow climb up a heavy grade.

In the patents above referred to the driving power of the booster motor is applied to the wheels of a locomotive trailer truck. The wheels of such a truck support a considerable load which is normally in part at least dead weight because it is not utilized to increase the tractive effort of the locomotive. The trailer truck wheels are therefore idle in so far as propelling the locomotive is concerned. By applying the driving power of the booster motor to these wheels the pulling power of a locomotive of given size can be greatly increased.

The invention herein may be used in association with this arrangement and I have shown it as so associated for illustrative purposes only since it can equally well be used where the driving power of the booster motor is applied to some other axle such, for instance, as an axle of the tender.

The wheels of the axle to which the booster is applied are of a diameter considerably smaller than that of the main driving wheels and therefore at high engine speeds the number of revolutions which they would make would be considerably in excess of the number made by the main drivers. This high speed could not be attained with safety by the booster motor because of the small size of the reciprocating parts. It is, therefore, desirable to cut in or connect the booster motor to the axle and wheels which it drives only at relatively low speeds of the locomotive. At high speeds the booster motor should be disconnected and therefore inoperative. The characteristics just set forth necessitate a booster entraining mechanism in addition to a throttle for controlling the supply of steam thereto.

With the foregoing in mind some of the objects of my invention may be more specifically stated as contemplating first the provision of steam actuated booster entraining mechanism, second, steam actuated booster throttle operating mechanism, third, the provision of an intercepting valve between the booster throttle and the booster entraining mechanism, the details of which will appear more particularly hereinafter and fourth, the provision of means for determining at what speed of the locomotive the booster motor will cut in or become entrained as a driving power. It is also the object of the present invention to provide means whereby the operation of each of the foregoing mechanisms is under the control of and operable in conjunction with the controlling devices of the main driving means of the locomotive.

The foregoing, together with such other objects as are incident to my invention or may appear hereinafter I attain by means of a construction which is diagrammatically illustrated in the accompanying drawing, wherein the single figure represents the parts in their functional relation to one another but not necessarily in their actual physical relation.

The booster motor represented as a whole by the reference character B is arranged to drive the trailer truck axle A through the medium of the pinion 1, idler gear 2 and driving gear 3 rigidly secured to the axle A. The idler gear is mounted upon a supporting member 4 which is pivoted upon the pin 5 so that the said gear may be swung or rocked into or out of mesh with the gear 3. It will be understood, of course, that the idler gear is constantly in mesh with the driving pinion 1. The detailed construction of the booster motor is not herein illustrated as it does not form any portion of the subject matter of the present invention. Suffice it to say that said motor is designed to drive the pinion 1 which in turn through the medium of the mechanism just described can be entrained or disentrained from the axle A.

The booster steam supply pipe 6 extends into the dome 7 on top of the locomotive boiler 8 and has interposed in it the booster throttle 9 and the intercepting mechanism indicated as a whole by the reference character C. The booster throttle is automatically operated through the medium of the device D the operation of which is directly under the control of the main driving means of the locomotive, which control is now to be described, and which it should be understood need not necessarily be embodied in the particular apparatus illustrated but which, nevertheless, is simple and efficient and at the present time the preferred construction.

Steam from the dome is admitted to the main dry pipe 10 when the engineman opens the main throttle 11 through the medium of the usual throttle lever in the cab not shown, the rod 12 and the bell crank 13. Before this throttle is opened, however, the reverse lever 14 is thrown "into the corner" as it is colloquially expressed so that the valve motion will be set to admit steam to the main cylinders throughout the entire stroke of the pistons. Suppose for the purpose of this descriptioin said corner position of the reverse lever 14 were at the right of the quadrant 15. I arrange a valve E having a spring held plunger 16 in the path of movement of the reverse lever 14 so that when said lever is moved into the corner the abutment 17 which it carries will depress the plunger 16 against the spring 18 and open communicatioin between pipes 19 and 20. The pipe 19 extends to the dry steam pipe 10 and, when the throttle 11 is opened, the pressure of the live operating steam is conducted to the left hand end of the piston 21 within the booster throttle operating device D. Under this pressure the piston 21 travels to the right against the pressure of the spring 22 and by means of the rod and bell crank connection to the booster throttle valve 9 said throttle valve is opened, all of which can be clearly understood from inspection of the drawing.

Steam from the dome can now pass down through the pipe 6 to the cylinder 23 of the intercepting valve C, but it cannot pass through this valve to the cylinders of the booster motor until after entrainment of said motor is effected.

At the time that pressure is entering cylinder 23 it also passes through a by-pass pipe 36 in which there is an adjustable valve 37. This by-pass is regulated to carry steam in relatively small quantities around the intercepting valve C and into the booster cylinders so that the driving pinion 1 and the idler gear 2 can be rotated during an entraining operation. If the locomotive be starting from a dead stop the pinion 2 will be promptly meshed with the gear 3 as the piston 24 moves to the right under the influence of the pressure in cylinder 23. But if the locomotive had been running without the booster and had begun to drop down in speed to the point where the assistance of the booster was again to be used the gear 2 would not be thrown into mesh with the axle gear 3 until such time as the two gears were rotating at substantially equivalent speeds. The reason for this is that when the locomotive is in motion the axle gear is revolving so that the teeth at the back are moving upwardly and have a tendency to throw out or prevent meshing of the idler gear until the peripheral speed of the two gears is substantially the same. The valve 37 in the by-pass can be adjusted to permit any desired supply of steam to reach the booster cylinders so that the pinion 1 and idler gear 2 can be made to rotate at a speed equivalent to any predetermined speed of the axle gear 3. Until such time, therefore, as the idler gear 2 and the axle gear 3 are rotating at substantially the same peripheral speed or the idler gear is rotating somewhat faster than the axle gear, the tendency is to prevent meshing with the teeth riding because the upward movement of the rear side of the axle gear acts to throw the idler gear away from the axle gear. Just as soon as the gears mesh the piston 24 will have finished its stroke to the right and seated itself against the shoulder 38. When this occurs port 30, heretofore closed, will be opened. It will be understood, of course, that piston 24 moves against the pressure of a spring 25 and forces the rod 26 to the right, the latter being connected by means of the eye 27 to the pin 28 on the rocking member 4. The rod 26 is shown as broken for purposes of convenience in illustration.

The other cylinder 29 of the intercepting valve C is connected to the interior of cylinder 23 by means of the passage 30 and also the port 31 both of which are normally closed, the former by piston 24 and the latter by the hollow portion 32 of a piston construction 33 located within the cylinder 29. After the piston 24 has moved to the right to entrain the booster motor the port 30 is uncovered as above indicated and pressure is admitted to the chamber 34. Piston 33 is then moved to the right against the pressure of the spring 35 which operation serves to uncover port 31 for the purpose of permitting full operating pressure to pass on through the lower end of the pipe 6 to the booster motor.

A summary of the operation is as follows:

In starting the locomotive the engineman first throws the reverse lever 14 into the corner in which position it moves valve E to open communication between pipes 19 and 20. The main locomotive throttle is now opened and operating steam for the main cylinders admitted to dry pipe 10. The pressure in this dry pipe is free to travel to the booster throttle operating valve D upon actuation of which steam from the dome reaches the intercepting valve C.

Steam is by-passed through 36—37 to the booster cylinders and piston 24 moves to the right to mesh the gears 2 and 3. After entrainment port 30 will be uncovered and the intercepting valve will be moved to admit steam at full operating pressure to the booster cylinders. The booster will continue to drive the axle A until such time as the engineman cuts back or hooks up the reverse lever 14 past a predetermined point which ordinarily occurs when the engine attains a moderate speed. The valve E closes communication between pipes 19 and 20 and piston 21 being then relieved of pressure is moved to the left by the spring 22 which causes the booster throttle valve to close. When the throttle valve closes, the intercepting valve pistons are forced to their normal positions by their respective springs in which positions they close the ports 30 and 31, it being understood, of course, that the pressure fluid in the cylinders 23 and 29 is exhausted through the customary booster cylinder docks, (not shown). The booster motor is thus disentrained and made inoperative.

By the foregoing arrangement it will be seen that if the locomotive be running it is a simple matter to control the speed at which the booster shall be cut in.

I claim:

1. In a controlling mechanism for a locomotive booster motor, the combination with the controlling mechanism for the locomotive, of booster entraining mechanism, a booster throttle valve, steam actuated means under the control of the controlling mechanism for the locomotive for opening said booster throttle valve, and an intercepting mechanism in the line of the booster steam supply and between said throttle valve and the booster which acts to actuate the entraining mechanism before admitting full operating steam pressure to the booster.

2. The combination of a normally inoperative locomotive booster motor, a throttle therefor, automatic means for opening said throttle when the main driving means of the locomotive is operating, and an intercepting mechanism in the line of the steam supply between the booster and its throttle which admits full operating steam pressure to the booster only when said booster is in operative condition.

3. In a booster motor controlling mechanism, the combination of a booster motor, steam actuated booster entraining means, and means for supplying full operating steam pressure to the motor, said last two means being so constructed and arranged as to insure complete entrainment of the booster motor prior to the time that any operating steam pressure reaches the booster through said supply means.

4. In a booster motor controlling mechanism, the combination of a booster motor, a steam supply line therefor, booster entraining means actuated by the pressure of steam in said supply line, and means in said line normally cutting off supply to the motor, said last two means being so constructed and arranged as to insure complete entrainment of the booster motor prior to the time that any steam reaches the booster through said supply line.

5. Controlling mechanism for booster motors comprising in combination, booster entraining mechanism, means for supplying steam to the booster motor, an intercepting mechanism in the line of the steam supply for said booster motor, and a by-pass around said intercepting mechanism, said intercepting mechanism permitting flow of full operating steam pressure to the booster motor only after entrainment takes place and said by-pass permitting relatively easy operation of the booster motor parts prior to entrainment.

6. Controlling mechanism for booster motors comprising in combination, booster entraining mechanism, means for supplying steam to the booster motor, an intercepting mechanism in the line of the steam supply for said booster motor, said intercepting mechanism being under the control of the entraining mechanism, and a by-pass around said intercepting mechanism.

7. A controlling mechanism for steam operated, locomotive, booster motors comprising in combination, steam actuated booster entraining mechanism and steam actuated mechanism for opening the supply of steam to the booster motor, said last mechanism being under the control of the controlling mechanism for the locomotive and said entraining mechanism being under the control of said mechanism for opening the supply of steam to the booster motor.

8. A controlling mechanism for steam operated, locomotive, booster motors comprising in combination, with the locomotive dry pipe, and the locomotive reverse lever, a booster throttle, motor means for opening said throttle, means for supplying steam from the dry pipe to said motor means, and means under the control of the reverse lever for controlling the said steam supply through said supplying means.

9. A controlling mechanism for steam operated, locomotive, booster motors comprising in combination, with the locomotive dry pipe, a booster throttle, and means directly actuated by steam from the dry pipe for opening the booster throttle.

10. A controlling mechanism for steam-operated, locomotive, booster motors comprising in combination, with the locomotive dry pipe, a booster throttle, means actuated by steam from the dry pipe for opening the booster throttle, a booster entraining mechanism, and means in the line of the steam supply from the throttle to the booster for actuating the entraining mechanism.

11. In a controlling mechanism for a normally disentrained locomotive booster motor, the combination with the controlling mechanism for the locomotive of a booster throttle valve, steam actuated means under the control of the controlling mechanism for the locomotive for opening said booster throttle, and steam actuated means under the control of said booster throttle for entraining the booster.

12. In a controlling mechanism for a normally disentrained locomotive booster motor, the combination with the controlling mechanism for the locomotive of a booster throttle valve, steam actuated means under the control of the controlling mechanism for the locomotive for opening said booster throttle, steam actuated means under the control of said booster throttle for entraining the booster, and means for preventing driving steam from reaching the booster until entrainment has been effected.

13. In a controlling mechanism for a normally disentrained locomotive booster motor, the combination with the controlling mechanism for the locomotive of a booster throttle valve, steam actuated means under the control of the controlling mechanism for the locomotive for opening said booster throttle, steam actuated means under the control of said booster throttle for entraining the booster, means for preventing driving steam from reaching the booster until entrainment has been effected and a relatively small capacity by-pass around said last mentioned means.

14. Locomotive booster apparatus comprising in combination with the locomotive throttle and the locomotive reverse lever, a booster throttle, means for opening said booster throttle actuated by steam passing through said locomotive throttle, and a reverse lever pilot valve controlling the supply of steam to the booster throttle opening means.

15. Locomotive booster motor apparatus comprising in combination, a booster normally disentrained from the locomotive, entraining mechanism therefor, means for supplying steam to the booster, a piston in said steam supply line acting under the influence of the supply steam to entrain the booster, and a valve normally closing the line of steam supply to the booster and located between said piston and said booster, said valve being opened to supply steam to the booster only after said piston has effected entrainment.

16. Locomotive booster motor apparatus comprising in combination, a normally disentrained booster, a steam supply line for the booster, means interposed in said line and actuated by the steam for causing entrainment of the booster, and a second means in said line preventing driving steam from reaching the booster until said first means has effected the entrainment thereof.

17. Locomotive booster motor apparatus comprising in combination, a normally disentrained booster, a steam supply line for the booster, means interposed in said line and actuated by the steam for causing entrainment of the booster, a second means in said line preventing driving steam from reaching the booster until said first means has effected the entrainment thereof and a relatively small capacity by-pass around both of said means which functions independently of either.

18. In locomotive booster apparatus the combination of a normally disentrained booster motor, a conduit for supplying steam to the booster in quantities sufficient to operate it as a driving factor, a valve normally preventing flow of operating steam thru said conduit, means subject to the pressure of steam in the conduit for entraining the booster, a comparatively small capacity by-pass around said valve for causing the booster to idle during entrainment, and a passage under the control of the entraining means for delivering steam to open said valve after entrainment has been effected.

19. In locomotive booster apparatus the combination of a normally disentrained steam-actuated booster motor, means subject to the pressure of the steam for entraining said motor, valve means normally preventing driving steam from reaching the motor, and means for causing said valve means to open to admit steam to the booster only after the booster has been completely entrained.

20. A locomotive booster motor controlling system comprising in combination, an axle gear, a driving pinion, an intermediate movable gear, means for supplying the booster motor with a comparatively limited quantity of steam, means for supplying said motor with full operating pressure, and means operated on by the operating pressure for throwing the movable gear into mesh, said limited supply being independent of said means which meshes the gear.

21. The combination of a normally disentrained, steam-actuated, booster motor, means responsive to the steam for entraining the booster motor, said means also controlling the supply of steam so that entrainment is completed before driving pressure of steam is admitted to the motor, and means for delivering a comparatively small quantity of steam to the booster motor independently of said entraining means.

In testimony whereof I have hereunto signed my name.

FRANK R. PETERS.